United States Patent [19]

Ripa et al.

[11] Patent Number: 5,595,714
[45] Date of Patent: Jan. 21, 1997

[54] RECOVERY OF GADOLINIUM AND ITS COMPLEXING AGENTS FROM AQUEOUS SOLUTIONS CONTAINING THEIR COMPLEXES

[75] Inventors: Giorgio Ripa; Paolo Morosi, both of Milan, Italy

[73] Assignee: Dibra S.P.A., Milan, Italy

[21] Appl. No.: 448,741

[22] Filed: May 24, 1995

[30] Foreign Application Priority Data

May 16, 1995 [IT] Italy .................. MI95A0986

[51] Int. Cl.⁶ ........................... C01F 17/00
[52] U.S. Cl. ........................ 423/21.1; 423/21.5
[58] Field of Search .................. 423/21.1, 21.5

[56] References Cited

U.S. PATENT DOCUMENTS

| | | | |
|---|---|---|---|
| 2,798,789 | 7/1957 | Spedding et al. | 423/21.5 |
| 2,897,050 | 7/1959 | Jaffe | 423/21.5 |
| 3,033,646 | 5/1962 | Hansen | 423/21.5 |
| 3,037,841 | 6/1962 | Krumholz | 423/21.5 |
| 3,054,655 | 9/1962 | Krumholz et al. | 423/21.5 |
| 3,167,389 | 1/1965 | Woyski | 423/21.5 |
| 3,275,404 | 9/1966 | Firsching | 423/21.1 |
| 3,615,173 | 10/1971 | Sparks et al. | 423/21.5 |
| 4,198,231 | 4/1980 | Gasset | 423/21.1 |
| 4,405,568 | 9/1983 | Nalewajek | 423/21.1 |

FOREIGN PATENT DOCUMENTS

| | | | |
|---|---|---|---|
| 597181 | 5/1960 | Canada | 423/21.5 |
| 63-182216 | 7/1988 | Japan | 423/21.1 |
| 862688 | 3/1961 | United Kingdom | 423/21.5 |

*Primary Examiner*—Steven Bos
*Attorney, Agent, or Firm*—Bucknam and Archer

[57] ABSTRACT

The invention refers to a novel process for the recovery of gadolinium and its complexing agent from aqueous solutions containing their complexes and/or salts of said complexes.

13 Claims, No Drawings

RECOVERY OF GADOLINIUM AND ITS COMPLEXING AGENTS FROM AQUEOUS SOLUTIONS CONTAINING THEIR COMPLEXES

FIELD OF THE INVENTION

This invention relates to a novel process for the recovery of gadolinium and its complexing agent from aqueous solutions containing their complexes and/or salts of said complexes.

DESCRIPTION OF THE PRIOR ART

In recent years, gadolinium complexes with polyaminocarboxylic chelants such as, for instance, diethylenetriaminopentaacetic acid (DTPA), have gained more and more importance, since they are used, when suitably formulated, as contrast agents in diagnostic procedures for Nuclear Magnetic Resonance (NMR).

Some of them are actually in clinical use such as for instance: Gd-DTPA, N-methylglucamine salt of gadolinium complex with diethylenetriaminopentaacetic acid, (MAGNEVIST®, Schering); Gd-DOTA, N-methylglucamine salt of gadolinium complex with 1,4,7,10-tetraazacyclododecan-1,4,7,10-tetraacetic acid, (DOTAREM®, Guerbet); Gd-DTPA-BMA, gadolinium complex of diethylenetriaminopentaacetic acid bis methylamide, (OMNISCAN®, Nycomed); Gd-HPDO3A, gadolinium complex of [10-(2-hydroxypropyl)-1,4,7,10-tetraazacyclododecan-1,4,7-triacetic acid, (PROHANCE®, Bracco).

At the same time, other gadolinium complexes are in an advanced development phase, such as: Gd-BOPTA (BRACCO, EP 230893), gadolinium complex of 4-carboxy-5,8,11-tris(carboxymethyl)-1-phenyl-2-oxa-5,8,11-triazatridecan-13-oic acid; Gd-EOB-DTPA (Schering, EP-A-405704), gadolinium complex of N-[2-[bis(carboxymethyl)amino]-3-(4-ethoxyphenyl)propyl]-N-[2-[bis(carboxymethyl)amino]ethyl]glycine.

As a matter of fact, when the industrial production of these products is foreseen, novel and unsolved problems arise, connected to environmental and economical aspects, regarding the availability of a process which allows recovery of the chelant and gadolinium from aqueous solutions of their complex, for instance from those coming from batches which do not correspond to the requested analytical specifications.

This type of process is extremely important since any elimination of the residual solutions of the complex, for instance through a biological treatment plant of industrial waste waters, is restricted by the toxicologic characteristics of gadolinium and free chelating agents. Moreover, their synthetic complexity and the consequent high manufacturing costs suggest their recovery and re-use.

The problems related to a process for the recovery of gadolinium and chelating agents from an aqueous solution containing their complex or a salt of said complex, first of all lie in the high stability of the complex within a quite wide pH range. As a matter of fact, only at suitably low pH values (about 2), gadolinium complex loses its stability.

These conditions bring about the shift of acid-base balances toward undissociated forms of carboxylic functions, which cannot any longer be complexed, resulting in the release of the undissociated chelating agent and gadolinium, as trivalent ion, in the aqueous solution.

However, the presence of gadolinium ions, hinders or sometimes prevents the precipitation of the undissociated chelating agent, which as such usually crystallizes from water.

The addition of an acid to a complex solution does not allow the chelant recovery by decomplexation: even in cases where a partial precipitation of the chelating agent is obtained, the recovery yield is low and the product quality is poor due to gadolinium ion contamination.

A second difficulty is due to the solubility of the gadolinium salts in aqueous solution, especially at low pH values. Even its sparingly soluble salts, such as sulphate or phosphate, become quite soluble when pH decreases, to the extent that gadolinium quantitative precipitation from a complex acid aqueous solution becomes impossible by addition of sulphate or phosphate ions.

The only exception is gadolinium oxalate, which also in diluted mineral acids (pH about 2) keeps its low solubility. However, the use of oxalate ions to precipitate gadolinium from a complex acid solution does not provide the expected results: for instance, when operating at pH values corresponding to the chelating agent release (about pH 2), the addition of oxalic acid causes not only the precipitation of gadolinium oxalate, but also the precipitation of the free chelating agent: as the gadolinium concentration decreases, a natural crystallization of the chelating agent starts which mixes with the already separated gadolinium oxalate.

On the other hand, under pH conditions higher than the one of the total decomplexation (pH>2), the addition of oxalic acid only allows the partial precipitation of gadolinium oxalate, since some gadolinium remains in solution as a complex.

SUMMARY OF THE INVENTION

Now it has been found, and it is the object of the present invention, to provide a process for the recovery of gadolinium and its complexing agent from aqueous solutions containing gadolinium complexes or the salts of said complexes, which comprises the addition to said aqueous solutions of an oxalate ions source at an acid pH (pH<2) lower than the one corresponding to the release of the complexing agent (decomplexation pH).

In this way an optimum compromise between gadolinium oxalate low solubility and complexing agent solubility can be achieved. In fact, at such pH values, the complexing agent remains in solution as undissociated free complexing agent thus allowing the recovery of gadolinium, which precipitates as oxalate. Subsequently, the chelating agent is recovered by simple crystallization from the filtered solution, which can be previously concentrated and adjusted to a suitable pH by addition of an appropriate base.

Therefore, this invention covers a process for the recovery of gadolinium and its complexing agent from aqueous solutions containing their complex or salt of said complex, which process comprises the following steps:
a) addition of an oxalate ions source to said aqueous solutions at a pH value lower than the one corresponding to the release of complexing agent (decomplexation pH),
b) filtration of the precipitated gadolinium oxalate,
c) precipitation of the complexing agent in its undissociated form, after adjustment of pH of the mother liquors from b) by addition of an inorganic or organic base and/or after optional concentration of said mother liquors,
d) optional recrystallization of said complexing agent.

The conditions hereinbelow described are particularly preferred for the process of this invention:

Step a):
— pH, after acidification of the solution of gadolinium complex or its salt, preferably with a mineral acid, ranges between 0.2 and 1.4, preferably between 0.5 and 1.0;
— the mineral acid used for the acidification of said aqueous solution is preferably selected from the group consisting of: hydrochloric acid, sulphuric acid, nitric acid;
— the temperature at which the addition of mineral acid is performed ranges between 0° and 50° C., preferably 15° and 30° C.;
— the molar ratio of oxalate ions to gadolinium complex is calculated stoichiometrically (1.5 mol/mol of complex) or considering a slight excess of oxalate ions (up to 10% excess);
— the source of oxalate ions is preferably selected from the group consisting of: oxalic acid or alkali metal oxalate;
— the addition temperature of the oxalate ions ranges between 0° and 50° C., preferably between 5° and 30° C.;
— the precipitation time of gadolinium oxalate ranges between 0.25 and 15 h;

Steps b) and c):
— after filtration of the formed gadolinium oxalate, pH of the mother liquors is adjusted with a suitable base to promote the precipitation of the gadolinium complexing agent;
— said base can be inorganic or organic, preferably selected from sodium or potassium hydroxide;
— the preferred pH for the crystallization of the complexing agent obtained by addition of said base, ranges between 1.4 and 4.5, preferably between 1.6 and 2.5;
— the crystallization temperature of the chelating agent ranges between 0° and 50° C., preferably between 0° and 35° C.;
— the crystallization time of the chelating agent ranges between 1 and 250 h;
— the gadolinium complexing agent is preferably a linear or macrocyclic polyaminocarboxylic acid chelating agent;
— said chelating agent is preferably selected from the group consisting of: DTPA, DOTA, 1,4,7,10-tetraazacyclododecan-1,4,7-triacetic acid (DO3A), HPDO3A, BOPTA, EOB-DTPA, DTPA-BMA, 2-methyl 1,4,7,10-tetraazacyclododecan-1,4,7,10-tetraacetic acid (MCTA), (a,a',a'',a''')-tetramethyl-1,4,7,10-tetraazacyclododecan-1,4,7,10-tetracetic acid (DOTMA) and their derivatives or analogues.

The advantages deriving from this operation sequence can be hereby summarized:
— a high precipitation yield of gadolinium oxalate
— a high purity of gadolinium oxalate
— a high recovery yield of the chelating agent
— a high purity of the recovery complexing agent (especially a low contamination by gadolinium itself).

Gadolinium oxalate can easily be reconverted into gadolinium oxide, according to procedures known in literature, for example by calcination, and therefore it can be recycled in the complex production process.

The recovered chelating agent, generally after a simple recrystallization from water or a suitable organic solvent, or a mixture thereof, is of the requested quality for the routinely used products for the preparation of the complex.

The following examples further illustrate the invention without limiting its scope.

EXAMPLE 1

Precipitation of gadolinium oxalate from an aqueous solution of methylglucamine salt of gadolinium complex of 4-carboxy-5,8,11-tris(carboxymethyl)-1-phenyl-2-oxa-5,8,11-triaza-tridecan-13-oic acid (Gd-BOPTA/Dimeg).

150 mL of concentrated HCl are added with stirring to 600 g of an aqueous solution of Gd-BOPTA/Dimeg (230 g, 0.217 mol) up to pH 0.5.

Then a solution prepared by diluting 42.4 g of dihydrate oxalic acid (0.335 mol) in 250 mL of deionized water is added. When the addition is over, the suspension is kept under stirring at room temperature for 15 min, then the precipitate is filtered, washed first with 50 mL of 0.1N HCl (the washing is combined with mother liquors ), then, separately, with 100 mL of deionized water. After drying the solid at the temperature of 50° C. under vacuum, 76.7 g of gadolinium oxalate (decahydrate) are obtained, containing 38.69% of gadolinium (equivalent to 0.190 mol).

Gadolinium recovery yield: 87%.

EXAMPLE 2

Isolation of 4-carboxy-5,8,11-tris-(carboxymethyl)-1-phenyl-2-oxa-5,8,11-triaza-tridecan-13-oic acid (BOPTA).

The Mother liquors of EXAMPLE 1 are adjusted to pH 1.7 with concentrated NaOH. The resulting suspension is kept under stirring at 15° C. for 5 days, then the crystallized product is filtered and washed with 130 g of deionized water cooled at 15° C. After drying at 50° C. under vacuum, 85.2 g of BOPTA are obtained (corresponding to 0.152 mol of the chelating agent).

Yield: 70.6%. Analytical characteristics: K.F.: 4.0% (w/w) HPLC (referred to the anhydrous substance—est. std.): 96.3% (area %) Residual chloride ions content (referred to the anhydrous substance): 2.95% (w/w) Residual gadolinium content: <0.5% (w/w)

EXAMPLE 3

BOPTA recrystallization.

75 g of the product of EXAMPLE 2 are dissolved in 300 g of deionized water. The resulting solution is filtered on 0.45 m filter, then cooled at 17° C. By following the crystallization procedure of EXAMPLE 2, 55.1 g of purified BOPTA (corresponding to 0.101 mol) are obtained.

Yield of recrystallization: 75% Recovery total yield: 52.5%. Analytical characteristics: K.F.: 5.0% (w/w) HPLC (referred to the anhydrous substance—est. std.): 99.1% Residual gadolinium content: <0.02% (w/w)

EXAMPLE 4

Precipitation of gadolinium oxalate from an aqueous solution of methylglucamine salt of gadolinium complex of diethylenetriaminopentaacetic acid (Gd-DTPA/Dimeg).

40 mL of concentrated HCl are added to an aqueous solution of 200 g of Gd-DTPA/Dimeg (67.4 mmol), with stirring, up to pH 0.5. After a few minutes, 13 g of oxalic acid dihydrate (103 mmol) dissolved in 80 mL of deionized water are added. The suspension is kept under stirring at room temperature for 4 h, then is filtered, and the solid is washed first with 25 mL of 0.1N HCl (the washing is combined with mother liquors), then, separately with 100 mL of deionized water. After drying at the temperature of 50° C. under vacuum, 23.4 g of gadolinium oxalate (decahydrate), containing 42.9% of gadolinium (equivalent to 63.9 mmol), are obtained. Gadolinium recovery yield: 94.8%.

EXAMPLE 5

Isolation of diethylenetriaminopentaacetic acid (DTPA).

Concentrated NaOH is added up to pH 1.7 to mother liquors of EXAMPLE 4. The mixture is then cooled at 15° C. and left to crystallize for 24 h, then it is filtered and the solid is washed with 25 mL of deionized water. After drying at 5.0° C. under vacuum, 24.05 g of DTPA (60.3 mmol) are obtained.

Yield: 89.5% Analytical characteristics: Complexometric titre (0.1N $ZnSO_4$): 98.7% (w/w) Residual gadolinium content: 0.15% (w/w) Residual chloride ions content: 0.25% (w/w)

EXAMPLE 6

Precipitation of gadolinium oxalate from an aqueous solution of methylglucamine salt of gadolinium complex of 1,4,7,10-tetraazacyclododecan-1,4,7,10-tetraacetic acid (Gd-DOTA/Meg)

40 mL of concentrated HCl are added to 170 mL of aqueous solution of Gd-DOTA/Meg (85.3 mmol), with stirring, up to pH 0.8. After a few minutes, 16.2 g of oxalic acid dihydrate (128.4 mmol) dissolved in 100 mL of deionized water are added. The suspension is kept under stirring at room temperature for 6h, then is filtered, the solid is washed first with 30 mL of HCl 0.1N (the washing is combined with mother liquors), then separately with 120 mL of deionized water. After drying at the temperature of 50° C. under vacuum, 30.8 g of gadolinium oxalate (decahydrate), containing 39.5% of gadolinium (equivalent to 77.5 mmol), are obtained. Gadolinium recovery yield: 91%.

EXAMPLE 7

Isolation of 1,4,7,10-tetraazacyclododecan-1,4,7,10-tetraacetic acid (DOTA)

Conc. NaOH is added to mother liquors of EXAMPLE 6, concentrated under vacuum up to a weight of 170 g, up to pH 1.8. The mixture is cooled at 5° C. and left to crystallize for 24h, then is filtered and the solid is washed with deionized water. After drying at 50° C. under vacuum, 30.3 g of crude DOTA (60 mmol) (the product can be purified by methods known in literature) are obtained.

Yield: 80% Analytical characteristics: Complexometric titre (0.1N $ZnSO_4$): 89.5% (w/w) Residual gadolinium content: 0.1% (w/w) Residual chloride ions content: 9.8% (w/w)

We claim:

1. A process for the recovery in essentially pure form of both gadolinium and the complexing agent thereof from an aqueous solution containing the complex between gadolinium and the complexing agent or a salt of said complex, said complexing agent being a linear or macrocyclic polyaminocarboxylic acid chelating agent, wherein said chelating agent is a member selected from the group consisting of diethylenetriaminopentaacetic acid (DTPA), 1,4,7,10-tetraazacyclododecan-1,4,7,10-tetraacetic acid (DOTA), 1,4,7,10-tetraazacyclododecan-1,4,7-triacetic acid (DO3A), [10-(2-hydroxypropyl)-1,4,7,10-tetraazacyclododecan-1,4,7-triacetic acid (HPDO3A), 4-carboxy-5,8,11-tris(carboxymethyl)-1-phenyl-2-oxa-5,8,11-triazatridecan-13-oic acid (BOPTA), N-[2-[bis(carboxymethyl)-amino]-3-(4-ethoxyphenyl)propyl]-N-[2-bis(carboxymethyl)-amino]ethylglycine (EOB-DTPA), N,N-bis[2-[(carboxymethyl)[(methylcarbamoil)methyl]amino]ethyl]glycine (DTPA-BMA), 2-methyl-1,4,7,10-tetraazacyclododecan-1,4,7,10-tetraacetic acid (MCTA), and (a,a',a'',a''')-tetramethyl-1,4,7,10-tetraazacyclododecan-1,4,7,10-tetracetic acid (DOTMA), which process comprises the following steps:

a) acidifying the solution containing said complex to a pH lower than the pH at which said complexing agent separates from the gadolinium;

b) adding oxalate ions to the acidified solution from step a) to precipitate gadolinium oxalate wherein said complexing agent remains in the acidified solution;

c) filtering the precipitated gadolinium oxalate from said acidified solution from step b);

d) adding a base to the filtered acidified solution from step c) to a pH between 1.4 and 4.5 to precipitate said complexing agent.

2. The process according to claim 1, wherein the pH after the acidification of said gadolinium complex solution in step a) ranges between 0.2 and 1.4.

3. The process according to claim 2 wherein said pH is between 0.5 and 1.

4. The process according to claim 1, wherein the acidification of said complex aqueous solution in step a) is carried out by addition of an acid which is a member selected from the group consisting of hydrochloric acid, sulphuric acid and nitric acid.

5. The process according to claim 4, wherein said acid is added in step a) at a temperature ranging between 0° and 50° C.

6. The process according to claim 5 wherein the temperature is 15°–30° C.

7. The process according to claim 1, wherein said oxalate ions are added to said gadolinium complex in a molar ratio between 1.5 mol/mol of complex and an excess of 10% of oxalate ions over the stoichiometric amount.

8. The process according to claim 1, wherein in step b) oxalic acid or metal alkaline oxalate is added as the source of said oxalate ions.

9. The process according to claim 1, wherein the temperature in step a) is between 0° and 50° C.

10. The process according to claim 9, wherein the temperature is between 5° and 30° C.

11. The process according to claim 1, wherein the pH in step d) is between 1.6 and 2.5.

12. The process according to claim 1, wherein said base in step d) is sodium or potassium hydroxide.

13. The process according to claim 1, wherein after step d) said complexing agent is recrystallized at a temperature between 0° and 50° C. from water.

* * * * *